(12) United States Patent
Hahn et al.

(10) Patent No.: US 8,683,671 B2
(45) Date of Patent: Apr. 1, 2014

(54) METHOD FOR FASTENING A RETAINER OF AN AIRBAG

(75) Inventors: Ernst-Ludwig Hahn, Rabenau (DE);
Wolfgang Werner, Reutlingen (DE);
Siegfried Lautner, Gmuend (DE);
Hermann-Josef Lohmer, Sindelfingen (DE)

(73) Assignee: Newfrey LLC, Newark, DE (US)

( * ) Notice: Subject to any disclaimer, the term of this patent is extended or adjusted under 35 U.S.C. 154(b) by 985 days.

(21) Appl. No.: 12/784,927

(22) Filed: May 21, 2010

(65) Prior Publication Data
US 2010/0293776 A1 Nov. 25, 2010

(30) Foreign Application Priority Data
May 22, 2009 (DE) .......................... 10 2009 022 322

(51) Int. Cl.
*B60R 21/20* (2011.01)
(52) U.S. Cl.
USPC ......... 29/525.01; 29/505; 29/407.05; 411/45; 24/314; 280/728.2
(58) Field of Classification Search
USPC .................. 29/525.01, 505, 407.01, 407.05; 411/45; 24/314, 307, 297; 280/728.2, 280/730.2
See application file for complete search history.

(56) References Cited

U.S. PATENT DOCUMENTS

| | | | | |
|---|---|---|---|---|
| 6,431,585 | B1 * | 8/2002 | Rickabus et al. | 280/728.3 |
| 7,290,795 | B2 * | 11/2007 | Kawai et al. | 280/730.2 |
| 7,338,068 | B2 * | 3/2008 | Kawai et al. | 280/728.2 |
| 7,374,200 | B2 * | 5/2008 | Ikeda et al. | 280/728.2 |
| 7,669,883 | B2 * | 3/2010 | Giddings et al. | 280/728.2 |
| 2006/0066080 | A1 | 3/2006 | Ikeda et al. | |
| 2006/0197317 | A1 | 9/2006 | Watanabe | |
| 2007/0158931 | A1 * | 7/2007 | Baumgartner et al. | 280/728.2 |
| 2008/0061535 | A1 * | 3/2008 | Everard et al. | 280/728.2 |

FOREIGN PATENT DOCUMENTS

| | | |
|---|---|---|
| EP | 1992429 A | 11/2008 |
| FR | 2915942 A | 11/2008 |

* cited by examiner

*Primary Examiner* — David Bryant
*Assistant Examiner* — Jason L Vaughan
(74) *Attorney, Agent, or Firm* — Michael P. Leary

(57) ABSTRACT

The invention concerns a method for fastening a retainer of an airbag, in particular of a window bag, to a body of a motor vehicle. The method for fastening including the steps of: arranging the retainer on the body by inserting a hollow pin in a corresponding bodyshell opening; positioning a tool on the retainer; and pressing a pin into an opening of the hollow pin to radially expand the hollow pin, and thereby securing the hollow pin in the corresponding bodyshell opening.

10 Claims, 1 Drawing Sheet

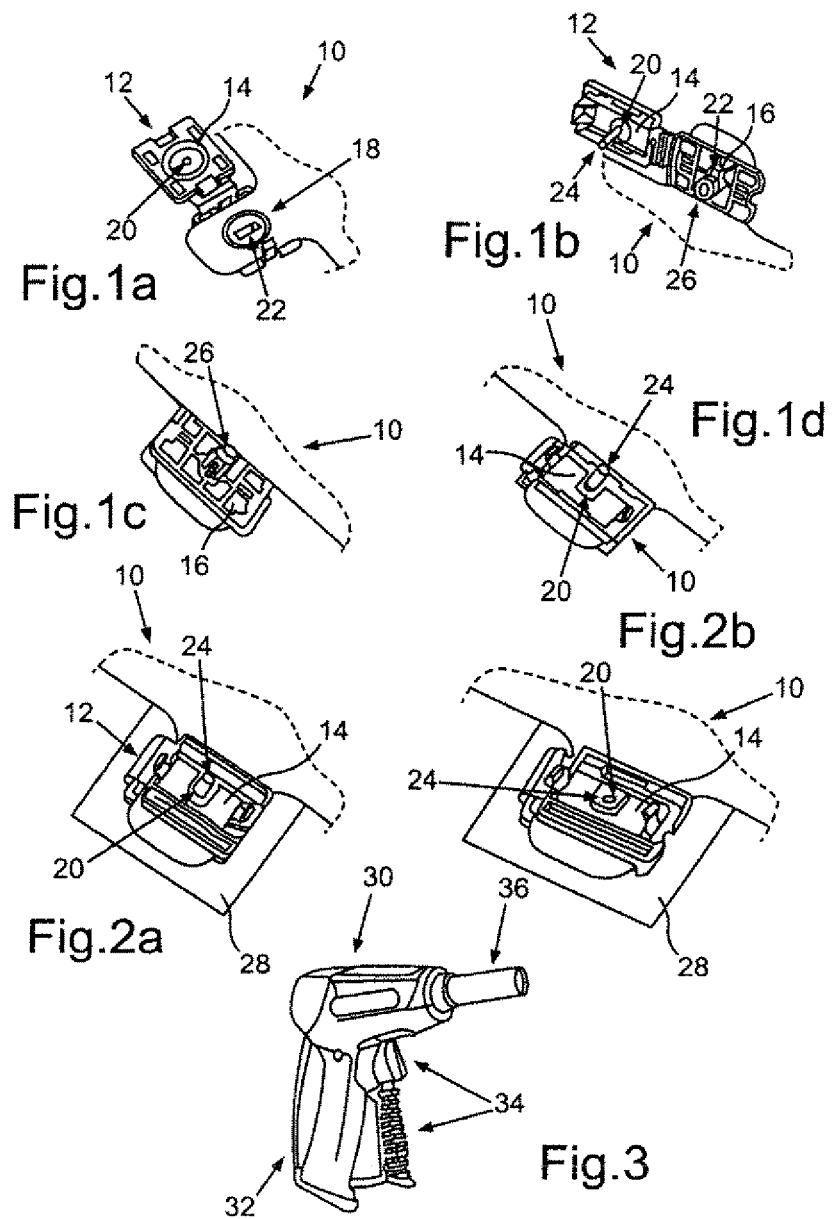

METHOD FOR FASTENING A RETAINER OF AN AIRBAG

CROSS-REFERENCE TO RELATED APPLICATIONS

This application claims priority from German Patent Application No. 10 2009 022 322.3, filed on May 22, 2009, the disclosure of which is incorporated herein by reference.

BACKGROUND OF THE INVENTION

The invention concerns a method for fastening a retainer of an airbag, in particular of a window bag, to a body of a motor vehicle.

In fastening window bags, it has heretofore been customary to use a retainer with a T-stud, which is welded to the body of the motor vehicle by means of a stud welding system. In this process, costly measures are required to avoid quality problems resulting from crooked T-studs. Fastenings for window bags are class A items, and must be documented 100%. In fastening methods currently in use, this is done by a second worker. This means that it is absolutely essential to ensure that optimal attachment of the window bag to the body is achieved.

BRIEF SUMMARY OF THE INVENTION

It is consequently the object of the present invention to create a method of the aforementioned type which simplifies fastening of a retainer of an airbag.

In order to attain the object of the invention, a method for fastening a retainer of an airbag, in particular of a window bag, to a body of a motor vehicle, having the following steps, is proposed:

arranging the retainer on the body by inserting a hollow pin in a corresponding bodyshell opening;

positioning a tool;

pressing a pin into an opening of the hollow pin, and thereby securing the hollow pin in the corresponding bodyshell opening.

In other words, the retainer, for example with a premounted airbag, is positioned on the body of the motor vehicle in a location that has been prepared with a bodyshell opening. In order to facilitate correct positioning, a hollow pin is formed on the retainer for insertion in the bodyshell opening. Then, the retainer is fastened to the body by pressing a pin into an opening of the hollow pin by means of a tool, causing the hollow pin to be anchored in the bodyshell opening. It is evident that in this way a method is created with which the retainer can be attached to the body of the motor vehicle without welding.

In a useful development of the invention, provision is made that a setting travel is sensed when the pin is pressed into the opening of the hollow pin. In this way it is possible to monitor whether the hollow pin, and thus the retainer, is/are properly secured.

In this regard, it has proven to be especially advantageous in another embodiment of the invention for the setting travel of the pin in question to be ascertained in a central computer. This reduces the amount of effort for quality control. As a result, it is no longer necessary to have a second worker perform an inspection after fastening of the retainer.

In additional embodiments of the invention, it has also proven advantageous for the number of pins set in each case to be ascertained. This can be used, for example, in quality control to more rapidly find pins that are not properly pressed in.

It has also proven to be advantageous for the specific number of pins to be set for each vehicle to be queried by means of a counter. This simplifies the work of the worker who must fasten airbags to the body using different numbers of retainers.

Additional advantages, features, and particulars of the invention are evident from the description below of a preferred exemplary embodiment, and with reference to the drawings.

BRIEF DESCRIPTION OF THE SEVERAL VIEWS OF THE DRAWINGS

The drawings show:

FIGS. 1a to 1d each show a perspective view of a window bag, partially shown, and a retainer at least partially installed thereon;

FIGS. 2a and 2b each show a perspective view of the window bag partially shown in FIG. 1 and of the retainer installed thereon, where in FIG. 2a a hollow pin of the retainer is inserted into a bodyshell opening in a body that is partially shown, and in FIG. 2b a pin of the retainer is pressed into an opening of the hollow pin, thus securing the hollow pin in the corresponding bodyshell opening; and FIG. 3 shows a perspective view of a tool for pressing the pin into the opening of the hollow pin.

DETAILED DESCRIPTION OF THE PREFERRED EMBODIMENTS

FIGS. 1a to 1d each show a perspective view of a window bag 10, partially shown, and a retainer 12 at least partially installed thereon. The retainer 12 is designed as a clip with a first wing 14 and a second wing 16 that may be hinged and folded together and hooked or attached to one another.

It is evident in FIG. 1a that the retainer 12 is arranged in an unclipped condition with an inner side of the second wing 16 in an opening 18 of the window bag 10. FIG. 1a also shows that the first wing 14 has a first opening 20 and second wing 16 has an opening 22. It is evident in FIG. 1b that a pin 24 is slidably mounted in the first opening 20 on an outer side of the first wing 14, and that a hollow pin 26 is formed at the opening 22 on an outer side of the second wing 16.

FIGS. 1c and 1d show, from both sides, the retainer 12 installed on the window bag 10 with wings 14 and 16 folded together in a clipped condition with a portion of the bag 10 securely sandwiched between the wings. The window bag 10 can then be fastened to the corresponding auto body 28 by means of the retainer 12. To this end, the retainer 12 is first arranged on the body 28 by inserting the hollow pin 26 of the retainer 12 in a bodyshell opening (not shown) of the body 28.

FIG. 2a shows the retainer 12, which is arranged as described above on a body 28 that is partially shown. In FIG. 2a, pin 24 is shown in a first or unlocked position.

In order to fasten the window bag 10 via retainer 12 to the body 28, a tool 30 is then positioned on the pin 24, and the pin 24 is pressed transversely through the openings 20 and 22 of the wings 14 and 16 into a bore of the hollow pin 26. By means of the resulting radial expansion of hollow pin 26, the retainer 12 and bag 10 are secured in the corresponding bodyshell opening. FIG. 2b shows a perspective view of the partially shown window bag 10, which is fastened to the body 28 by means of the retainer 12 as described above. In comparison with FIG. 2a, it is evident that the pin 24 here is already pressed through wings 14 and 16 into a second or locked position.

FIG. 3 shows a perspective view of a tool 30 for pressing the pin 24 into the opening of the hollow pin 26. This tool 30 has a convenient pistol shape, with a grip 32 on which is arranged at least one trigger 34 for pressing in the pin 24, and a barrel-like tube 36 in the end of which the pin 24 fits. The pin 24 can be pressed in by, e.g., a piston movably arranged in the tube 36 that is moved toward the end of the tube 36 by, e.g., compressed air or a lever mechanism.

To monitor that the hollow pin 26, and hence the retainer 2, is properly secured, in the present case the setting travel during pressing of the pin 24 into the opening of the hollow pin 26 is sensed.

In addition, the setting travel of the particular pin 24 can be ascertained in a central computer so as to thereby document the quality of the fastening of each individual retainer 12.

Similarly, the number of pins 24 that are set in each case can be ascertained, and the number of pins 24 to be set for each vehicle can be queried through a counter. In this way the work of the worker, who must fasten airbags to the body using different numbers of retainers, can be simplified.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method for fastening an airbag to a body of a motor vehicle using a tool, the method comprising the steps of:
   providing a retainer including a first wing, a second wing, and a bendable hinge joining the first wing and second wing, the first wing further including an axially movable pin on an outer side of the first wing, and the second wing including a hollow pin projecting from an outer side of the second wing;
   folding the retainer at the hinge so that a portion of the airbag is clamped between the first wing and the second wing, and the pin is axially aligned with the hollow pin;
   arranging the retainer on the body over a near side of a bodyshell opening of the motor vehicle;
   inserting the hollow pin through the bodyshell opening;
   positioning the tool into operable engagement with the pin;
   pressing the pin axially into an opening of the hollow pin (26), and
   expanding radially the hollow pin on a far side of the bodyshell opening and securing the hollow pin in the bodyshell opening.

2. A method according to claim 1, wherein a setting travel is sensed when the pin is pressed into the opening of the hollow pin.

3. A method according to claim 2, wherein the setting travel of the pin is ascertained in a central computer.

4. A method according to claim 2, wherein the number of pins that are pressed in the motor vehicle is ascertained.

5. A method according to claim 2, wherein the number of pins (24) to be pressed for the motor vehicle is queried through a counter.

6. A method according to claim 1, and further comprising the step of sensing the travel of the pin when the pin is pressed into the opening of the hollow pin.

7. A method according to claim 6, and further comprising the step of determining from the travel of the pin whether the retainer is secured.

8. A method according claim 6, wherein the step of determining is performed by a central computer.

9. A method according to claim 6, and further comprises the additional steps of:
   providing a second retainer including a second pin;
   pressing the second pin; and
   summing the number of pins that are pressed in the motor vehicle.

10. A method according to claim 6, and further comprising the step of querying through a counter the number of pins to be pressed for the motor vehicle.

* * * * *